United States Patent [19]

Haferl

[11] 3,814,980

[45] June 4, 1974

[54] S-CORRECTED WAVEFORM GENERATOR

[75] Inventor: Peter Eduard Haferl, Adliswil, Switzerland

[73] Assignee: RCA Corporation, New York, N.Y.

[22] Filed: Oct. 12, 1972

[21] Appl. No.: 296,862

[30] Foreign Application Priority Data

Oct. 12, 1971 Great Britain .................... 47423/71

[52] U.S. Cl. ......................... 315/27 GD, 315/27 TD

[51] Int. Cl. ............................................ H01j 29/70

[58] Field of Search .................... 315/27 TD, 27 GD

[56] References Cited

UNITED STATES PATENTS 3,432,720 3/1969 Brunner ............................ 315/27 R 3,543,080 11/1970 Woensch ........................ 315/27 GD 3,660,717 5/1972 Eltgroth ......................... 315/27 GD 3,721,857 3/1973 Haferl ............................ 315/27 GD

*Primary Examiner*—Leland A. Sebastian

*Assistant Examiner*—P. A. Nelson

*Attorney, Agent, or Firm*—Eugene M. Whitacre; Paul J. Rasmussen

[57] ABSTRACT

A television deflection waveform generator produces an "S" corrected sawtooth wave. A first charging circuit supplies energy to a second charging circuit which controls the development of the waveform during a first trace portion of the deflection cycle. The first charging circuit primarily controls the development of the corrected waveform during a second trace portion of the deflection cycle.

6 Claims, 10 Drawing Figures

S-CORRECTED WAVEFORM GENERATOR

BACKGROUND OF THE INVENTION

This invention relates to television waveform generators and, more particularly, to linearity corrected deflection waveform generators.

In a television receiver an electron beam, or three electron beams in the case of a color receiver, is modulated by video signals obtained from the received composite television signal and simultaneously deflected horizontally and vertically over the picture tube viewing screen to form the video display. The beam deflection is synchronized by sync signals also derived from the received composite television signal. Beam deflection is commonly achieved by energizing deflection coils placed around the picture tube by generally sawtooth scanning current waveforms. The sawtooth portion of current occupies the greater portion, commonly called the trace interval, of each deflection cycle and during this interval the video is displayed. During a smaller portion, termed the retrace interval, of each deflection cycle no video modulates the beam and the beam is quickly returned from bottom to top of the raster, and from right to left in the case of horizontal deflection, in preparation for the next succeeding respective vertical and horizontal trace intervals.

The video signal occupies a linear time base. In order to present a linear video display to the television viewer, the video modulated beam must travel over the viewing screen at a constant velocity. This requirement presents a problem because the viewing screen is relatively flat whereas the electron beam is considered to originate at a relatively fixed point at the deflection center of the deflection yoke and is swept with a constant angular velocity across the viewing screen as the deflection coils are energized with a linear sawtooth current. This results in the beam at the screen actually traveling faster at the beginning and end of the trace relative to the center of trace in the central portion of the viewing screen, producing a nonlinear display in which the video appears stretched at the edges of the raster relative to the center.

One way to correct this nonlinear display problem is to alter the shape of the linear sawtooth deflection current waveform during the trace interval. If the sawtooth current is controlled to increase at a slower rate at the beginning and end of the trace interval, the nonlinear display can be corrected. This particular type of sawtooth wave correction is called S-correction because of the appearance of the thus corrected sawtooth wave. It is known that S-correction of the sawtooth wave can be achieved by adding to the sawtooth the proper phase and amplitude parabolic wave. A parabolic wave at the vertical deflection rate can be obtained from the vertical deflection coils. Typically, this parabolic wave may be further altered in phase and amplitude and then added to the sawtooth wave to provide the correct vertical output stage driving waveform necessary for a linear video display. One problem associated with this manner of achieving S-correction is that the variation from receiver to receiver of values of such circuit elements as the capacitor AC coupling the vertical coils to the output stage varies the phase and amplitude of the parabolic wave and thus the shaping of the S-corrected sawtooth wave. Another problem is that variation in the loading of the deflection coils in color receivers as the convergence circuitry is adjusted varies the shape of the parabolic wave and hence of the S-corrected sawtooth wave.

An object of this invention is to provide an improved linearity corrected deflection waveform generator which is substantially unaffected by the deflection output stage circuit elements and variations in the loading of the deflection coils.

A deflection waveform generator embodying the invention includes a first charging circuit coupled through an impedance to a voltage source. An active current conducting device is coupled to the first charging circuit for providing a shunt path for the charging current. A second charging circuit is coupled to the first charging circuit and to the active current conducting device such that during a first portion of the deflection trace interval energy from the first charging circuit is coupled to the current conducting device via the second charging circuit for controlling its conduction and thereby the shape of a deflection waveform obtained from the junction of the impedance and the first charging circuit. During a second portion of the trace interval the deflection waveform shape is controlled primarily by the current in the first charging circuit. Another feature of the invention is that discharge means responsive to a source of signals at the deflection rate are coupled to the first and second charging circuit for causing discharge of those circuits during the retrace interval of the deflection cycle.

A more detailed description of the invention is given in the following description taken in conjunction with the accompanying drawings of which:

DESCRIPTION OF THE INVENTION

Figure 1:
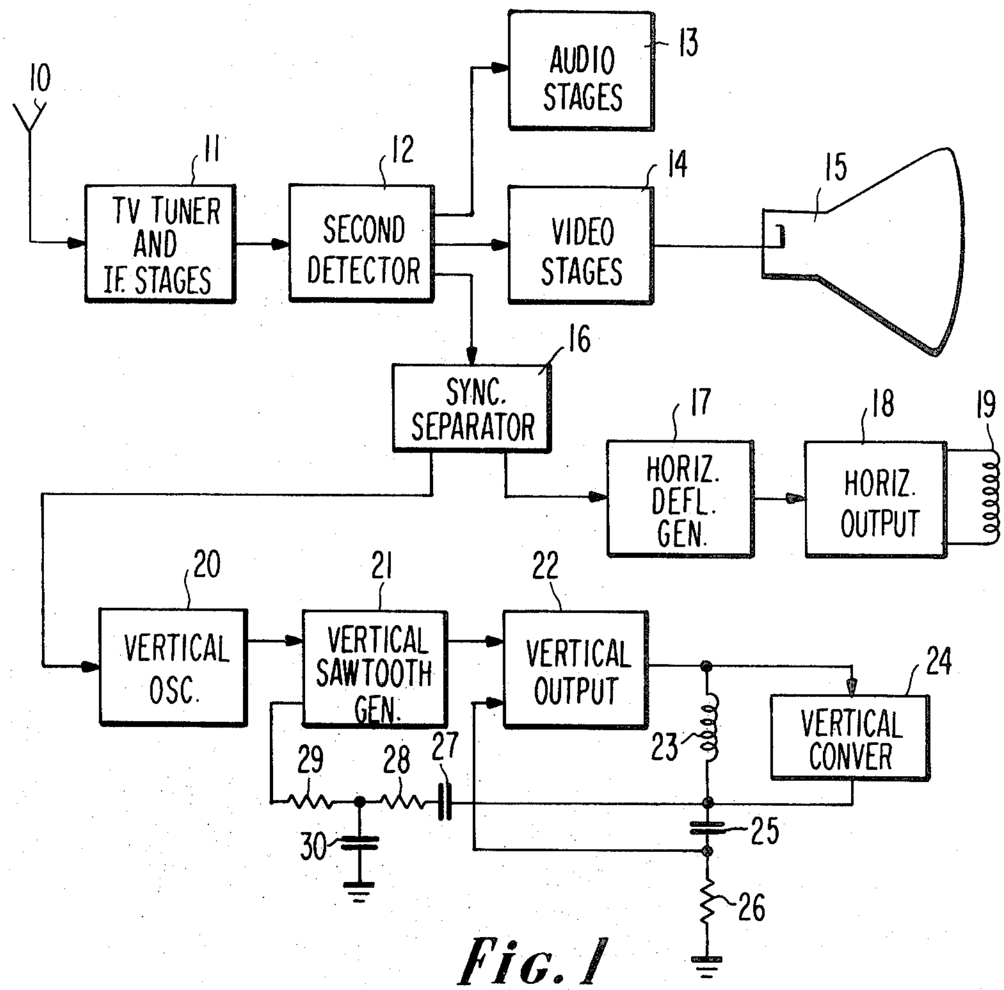
Fig. 1 PRIOR ART
FIG. 1 is a block diagram of a television receiver including a prior art arrangement for providing deflection waveform linearity correction.

FIG. 1 is a block diagram of a television receiver including a prior art arrangement for providing deflection waveform linearity correction. A receiving antenna 10 is coupled to a tuner and I.F. stage section 11 of a color television receiver. A second detector 12 demodulates the signal and provides a plurality of output signals. The sound portion of the signal is coupled to audio stage 13. The video portion of the signal, including the color and luminance signal components, are coupled to video stages 14 for processing prior to being coupled to the beam control elements of picture tube 15. Second detector 12 also provides a signal coupled to a sync separator 16 which separates the horizontal and vertical sync signal components. The horizontal sync signals are coupled to a horizontal deflection generator 17 which provides a suitable signal for driving a horizontal output stage 18 which, in turn, provides scanning current for a horizontal deflection winding 19.

The vertical sync signals from sync separator 16 are coupled to a vertical oscillator stage 20 which provides signals at the vertical scanning rate. These signals are coupled to a vertical sawtooth generator 21 which provides a generally sawtooth shaped waveform which is coupled to a vertical output stage 22. The vertical output stage 22 may comprise a complementary symmetry or a quasi-complementary symmetry transistor amplifier arrangement with a suitable driver stage. Vertical output stage 22 provides sawtooth scanning current waveforms for a vertical deflection winding 23. The other end of deflection winding 23 is returned to ground through a DC blocking or coupling capacitor 25 and a current sampling feedback resistor 26. The current representative voltage developed across resistor 26 is fed back to the vertical output stages to ensure linear operation of the output stages. Vertical convergence circuitry 24 is coupled in parallel across vertical deflection winding 23 and utilizes the deflection winding voltage waveform for providing convergence of the three beams. The waveform obtained at the junction of winding 23 and capacitor 25 is coupled through a capacitor 27 to an integrating network comprising resistors 28, 29 and a capacitor 30 for integrating the waveform to provide the proper phase and amplitude parabolic wave which is added to the sawtooth wave generated in sawtooth generator 21 to provide linearity correction commonly referred to as S-correction.

It is desirable that the proper linearity correction be maintained from one receiver to another as well as to remain constant in a given receiver as other receiver adjustments are made. In this respect the arrangement shown in FIG. 1 may be somewhat deficient. For example, the vertical convergence circuitry which requires the waveform developed across the winding 23 provides a shunt path for vertical deflection current, the impedance of which shunt path varies as the vertical convergence adjustments are made. The variations in current caused by variations in the vertical convergence circuitry are sensed by resistor 26 as a change in deflection winding scanning current and the feedback loop compensates for this. Thus, there can be an undesirable vertical picture height variation with vertical convergence circuitry adjustments.

Further, coupling capacitor 25 has a relatively large capacitance, which may be in the order of 500 to 2,000 microfarads. The usual tolerance on these capacitors is such that there is enough capacitance variations from one capacitor to another to affect the phase and amplitude of the parabolic wave used for S-correction, which results in undesirable linearity variations from receiver to receiver. Additionally, in the arrangement shown in FIG. 1, the parabolic waveform used for S-shaping is in the feedback loop of the vertical deflection circuit. While the feedback is desirable for linear operation of the output stages, it is undesirable that the S-shaping wave be affected by the feedback loop operation.

Figure 2:
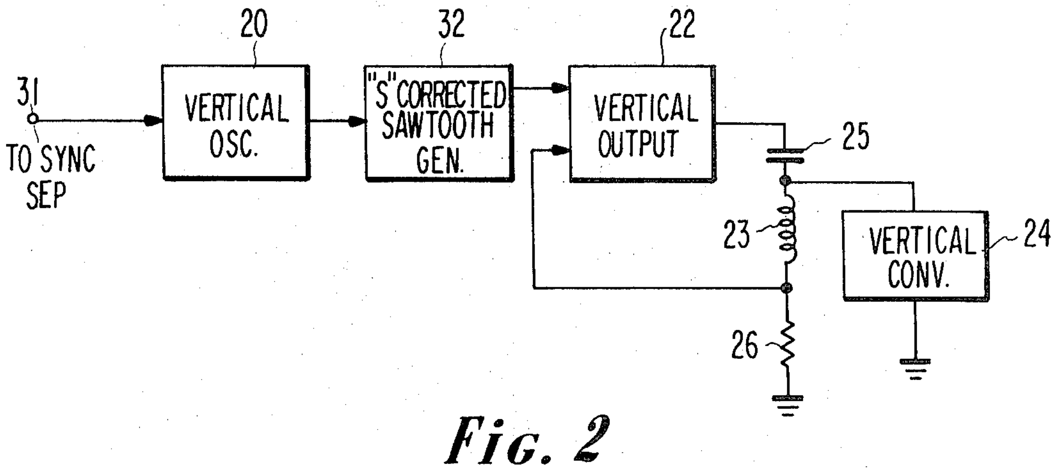
FIG. 2 is a block diagram of a deflection waveform linearity correction arrangement embodying the invention.

FIG. 2 is a block diagram of a deflection waveform linearity correction arrangement embodying the invention. The block diagram in FIG. 2 replaces the blocks starting with vertical oscillator 20 in FIG. 1. The vertical sync pulses obtained from sync separator 16 in FIG. 1 are coupled to a terminal 31 in FIG. 2. These sync pulses synchronize vertical oscillator 20, which, in turn, provides the proper scanning rate vertical signals which are coupled to an S-corrected vertical sawtooth generator 32. It should be noted that in FIG. 2 the S-correction of the sawtooth wave is accomplished within the sawtooth generator 32. The S-corrected sawtooth wave of generator 32 is coupled to the vertical driver and output stages 22, which supplies vertical rate linearity corrected sawtooth scanning currents through coupling capacitor 25 to vertical deflection winding 23. The bottom end of winding 23 is returned to ground through current sampling resistor 26. The vertical convergence circuitry, which is similar to that utilized in FIG. 1, is of conventional design and is connected between the junction of coupling capacitor 25 and deflection winding 23 and ground. Thus, the voltage developed across deflection winding 23 is applied to the convergence circuitry 24. Similar to the arrangement in FIG. 1, feedback for the vertical output stage 22 is obtained from the junction of winding 23 and current sampling resistor 26. In the arrangement in FIG. 2 current sampling resistor 26 samples only the deflection winding current and not the current through the convergence circuitry 24. Thus, the variation in picture height with convergence circuitry adjustments is substantially eliminated. As stated above, the S-shaping linearity correction of the vertical sawtooth wave is accomplished within generator 32. Thus, the corrected wave is not dependent on the value of the coupling capacitor 25. Also the S-shaping is not affected by the feedback loop as it is not a part thereof.

Figure 3:
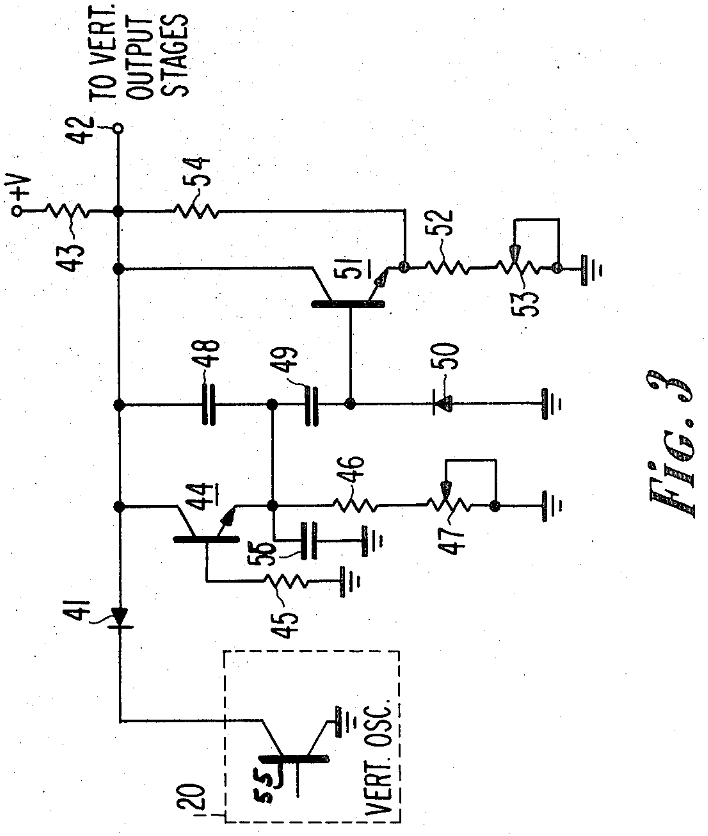
FIG. 3 is a schematic circuit diagram of the S-corrected deflection waveform generator illustrated as a block in FIG. 2.

FIG. 3 is a schematic circuit diagram of the S-corrected waveform generator illustrated as block 32 in FIG. 2. FIGS. **4*a*–4*g* illustrate voltage and current waveforms obtained at various points in the circuit of FIG. 3. A vertical oscillator 20, similar to the oscillator 20 of FIGS. 1 and 2, is coupled through a diode 41 to the sawtooth generator. The vertical rate signals provided by oscillator 20 are illustrated by the waveform 60 in FIG. 4*a*. Diode 41 is poled to pass these negative-going vertical rate pulses. A resistor 43 is coupled between a source of operating potential +V and the junction of a generator output terminal 42, a resistor 54, a collector electrode of transistor 51, a capacitor 48, and the collector electrode of a transistor 44. Capacitor 48 is coupled in a first charging path between voltage source +V and ground via resistor 43 on one side of the capacitor and resistor 46 and potentiometer 47 on the other. Transistor 51 has its emitter electrode coupled to ground through a resistor 52 and a potentiometer 53. Resistor 54 provides positive feedback from terminal 42 to the emitter electrode of transistor 51.**

A second charging circuit comprises capacitor 49 having one terminal thereof coupled to the emitter electrode of transistor 44 and capacitor 48 and the other terminal thereof coupled through a first path comprising a diode 50 to ground and a second path including the base-emitter junction of transistor 51 and resistor 52 and potentiometer 53 to ground. Discharge transistor 44 has its emitter electrode coupled to ground through resistor 46 and potentiometer 47. The base electrode of transistor 44 is returned to ground through a resistor 45. Resistor 45 is selected to limit the current of transistor 44 and increases the retrace voltage of the deflection waveform generated by the circuit. An oscillation-suppressing capacitor 56 is connected between the emitter electrode of transistor 44 and ground.

Figures 4A, 4B, 4C, 4D, 4E, 4F, 4G:
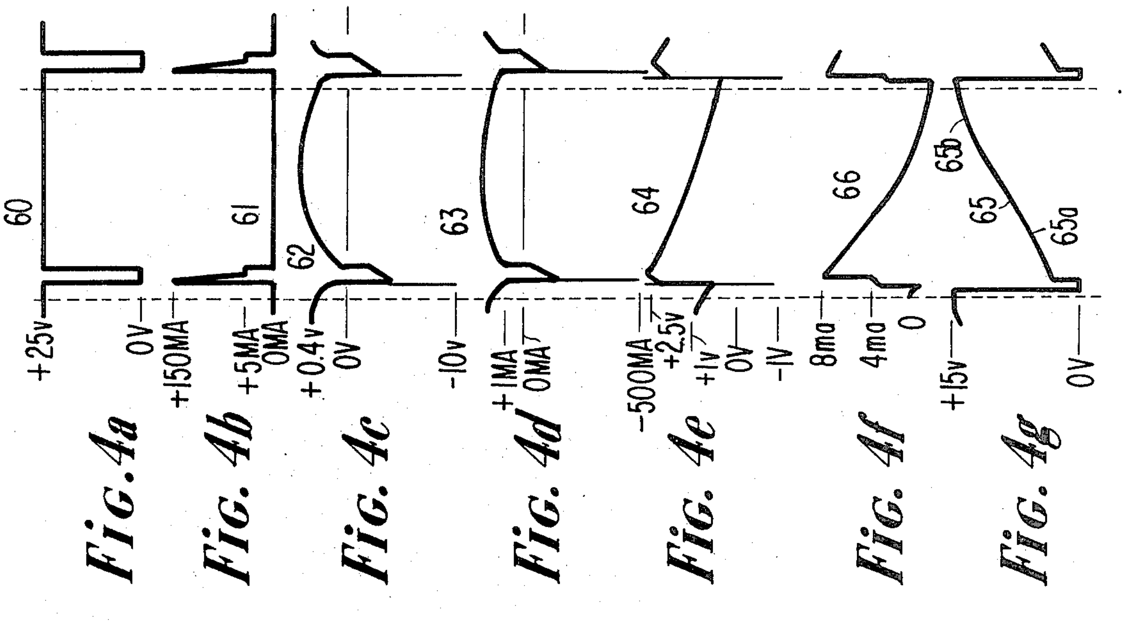
FIGS. 4*a*–4*g* illustrate voltage and current waveforms obtained at various points in the circuit of FIG. 3.

Operation of the circuit will be described starting with the beginning of the trace interval at which time the linearity corrected sawtooth waveform is generated. A negative-going pulse from vertical oscillator 20 is removed and capacitor 48 charges from the +V supply through resistor 46 and potentiometer 47 to ground. The charging current for capacitor 48 is illustrated by waveform 63 of FIG. 4*d*. As capacitor 48 begins its relatively long time constant exponential charge, the charging current, as illustrated by waveform 63 of FIG. 4*d*, results in a positive voltage being developed at the junction of resistor 46 and capacitor 48. This positive voltage serves as a voltage source which charges capacitor 49. Capacitor 49 charges from this source through the base-emitter junction of transistor 51 and through resistor 52 and potentiometer 53 to ground. Capacitor 49 is selected to have a smaller value than capacitor 48 and tends to differentiate the voltage waveform applied to it from the junction of resistor 46 and capacitor 48. The base drive voltage for transistor 51 obtained during the charging of capacitor 49 is illustrated by waveform 64 of FIG. 4*e*. The initial relatively high base drive voltage causes transistor 51 to conduct heavily during a first portion of the trace interval. The base drive voltage waveform appears inverted as the collector voltage of transistor 51. This collector voltage, which forms the S-corrected voltage waveform obtained at terminal 42, is illustrated in FIG. 4*g*. The collector current of transistor 51 is illustrated in FIG. 4*f*. As transistor 51 conducts heavily during the initial portion of the trace interval, the output voltage waveform portion 65*a* of FIG. 4*g* is determined primarily by this conduction. Thus, the shape of the output voltage waveform of FIG. 4*g* during this trace portion is an inverted exponential waveform of the charging current of capacitor 48 as modified by the capacitor 49, which couples a portion of this current to transistor 51.

As capacitor 48 continues to charge during the latter portion of the trace interval, its charging current continues to decrease exponentially with a resulting decrease in voltage developed across resistor 46 and potentiometer 47. This decreasing voltage results in a decreasing base drive current from capacitor 49 to transistor 51 and the conduction of transistor 51 decreases. With less current being passed through transistor 51, which is in shunt with the charging current for capacitor 48, the effect of transistor 51 on the output waveform shape decreases and the shape of the output voltage waveform 65 of FIG. 4g is determined primarily by the charging of capacitor 48 through resistors 43, 46 and potentiometer 47. The exponential charging of capacitor 48 during the latter half of trace controls the voltage waveform during the portion 65b of the output waveform of FIG. 4*g*. Thus, the S-shaping is determined during the first portion of trace by the amount of charging current of capacitor 48 coupled through capacitor 49 which controls the conduction of transistor 51, and, during the latter half of trace, primarily by the charging current of capacitor 48 as transistor 51 conduction is greatly reduced relative to its conduction at the start of trace. Resistor 54 provides feedback to transistor 51, which speeds up the decreasing influence of transistor 51 during the latter half of trace.

Potentiometer 47 in the charging path of capacitor 48 adjusts the degree of S-correction by varying the charging time constant for capacitor 48. If potentiometer 47 is adjusted to minimum resistance, substantially only the second half of the trace interval is S-corrected. Conversely, with potentiometer 47 adjusted for maximum resistance, then primarily only the first half of the trace interval is S-corrected. Potentiometer 53 adjusts the amount of S-correction by varying the gain and input impedance of transistor 51.

The retrace portion of each deflection waveform cycle is initiated by the application of the 400 microsecond negative-going pulse 60 of FIG. 4*a* from vertical oscillator 20 through diode 41. This negative pulse, having a maximum negative value of about zero volts, effectively clamps the output terminal and the collector electrodes of transistors 44 and 51 as well as the top terminal of capacitor 48 to this voltage. Application of this pulse to the circuit causes the junction of capacitors 48 and 49 to become negative and causes capacitor 49 to charge through diode 50, keeping a slightly negative potential at the junction of capacitor 49 and diode 50. The zero volt clamping pulse applied to capacitor 48 causes a charging current from ground through potentiometer 47 and resistor 46 to the capacitor. Pulse 60, generated in the vertical oscillator, results in a discharge transistor 55 within the oscillator being turned on, which provides a discharge path for capacitor 48 through diode 41 and transistor 55 to ground. The discharge of capacitor 48 causes a current to flow from ground through potentiometer 47 and resistor 46 to develop a peak negative voltage of about −10 volts at the junction of resistor 46 and the emitter electrode of transistor 44 as indicated by the waveform 62 of FIG. 4*c*. This negative voltage turns on transistor 44 which, coupled across capacitor 48, helps to discharge it. The base current of transistor 44 is limited by resistor 45 to allow transistor 44 to saturate but not to conduct excessively to cause self-destruction.

The retrace time of the circuit is determined primarily by the charging time constant of capacitor 49 via diode 50 and capacitor 48. At the end of the 40 microsecond retrace period when the charge across capacitors 49 and 48 is equal, transistor 44 continues to discharge capacitor 48 since its emitter electrode is still negative as illustrated by waveform 62 of FIG. 4*c*. As capacitor 48 continues to discharge the emitter of transistor 44 rises in potential towards zero volts. This causes capacitor 49 to discharge through the base-emitter junction of transistor 51, keeping it conducting at the 4 milliampere level as illustrated by waveform 66 of FIG. 4*f*. The output terminal 42 remains clamped at the negative limit of the pulse from vertical oscillator 20 until the termination of the negative-going 400 microsecond pulse. At the termination of this pulse, capacitor 48 again starts to charge from the +V source as described above and the next trace interval is initiated.

The following circuit element components and values were utilized in a successful operation of an S-corrected deflection waveform generator circuit embodying the invention:

| | |
|---|---|
| Transistors **44** and **51** | BC107 |
| Diodes **41** and **50** | BAX13 |
| Resistor **43** | 2.2 KΩ |
| Resistor **45** | 1 KΩ |
| Resistor **46** | 220 Ω |
| Resistor **47** | 470 Ω |
| Resistor **52** | 56 Ω |
| Resistor **53** | 100 Ω |
| Resistor **54** | 5.6 KΩ |
| Capacitor **48** | 2.2 μf |
| Capacitor **49** | 0.22 μf |
| Capacitor **56** | 270 pf |
| V+ | 25 volts |

What is claimed is:

1. A deflection waveform generator comprising:
a source of voltage;

an impedance means coupled to said voltage source;

a first charging circuit including a first capacitor coupled to a terminal of said impedance means remote from said voltage source;

an active current conducting device, the main current conducting path of which is coupled at one electrode to said terminal and at another electrode to a second charging circuit;

said second charging circuit including a second capacitor coupled to said first charging circuit and to a control electrode of said active current conducting device for coupling energy from said first charging circuit to said device for causing said device to conduct a first current during a first portion of each deflection waveform cycle for determining the voltage waveform obtained at said terminal, and for causing said device to conduct substantially less current during a second portion of said deflection waveform cycle than during said first portion of said deflection waveform cycle such that during said second portion of said deflection waveform cycle said voltage waveform is determined primarily by current in said first charging circuit;

a source of signals occurring at said deflection waveform rate; and discharge means coupled to said signal source and to said first charging circuit for discharging said first capacitor during a third portion of said deflection cycle.

2. A deflection waveform generator according to claim 1 wherein said second capacitor is of a smaller value than said first capacitor for altering the shape of the voltage waveform coupled to said control electrode primarily during said first trace portion.

3. A deflection waveform generator according to claim 2 wherein said active current conducting device is a first transistor having its main current conduction path coupled between said terminal of said impedance means remote from said voltage source and a point of reference potential for serving as a shunt current path for current in said first charging circuit.

4. A deflection waveform generator according to claim 3 wherein said discharge means includes a unidirectional current conducting device coupled to said source and to the junction of said first capacitor and said terminal of said impedance means for passing said signals from said source for initiating the retrace interval of said deflection cycle and for clamping said junction at the voltage level of said pulses for causing said first capacitor to discharge during said retrace interval.

5. A deflection waveform generator according to claim 4 wherein said discharge means further includes a second transistor coupled across said first capacitor and to a point of reference potential such that the discharge of said first capacitor renders said second transistor conducting for providing an additional discharge path for said first capacitor.

6. A deflection waveform generator according to claim 5 wherein a positive feedback path is provided from said junction to the main current conduction path electrode of said first transistor coupled to said point of reference potential.

* * * * *